United States Patent [19]

Uchiyama et al.

[11] 4,259,603
[45] Mar. 31, 1981

[54] ELECTRIC MOTOR

[75] Inventors: Masami Uchiyama, Inagi; Toru Fuzimori, Tokyo; Toshio Mori, Kashiwa, all of Japan

[73] Assignee: Sony Corporation, Tokyo, Japan

[21] Appl. No.: 877,286

[22] Filed: Feb. 13, 1978

[30] Foreign Application Priority Data

| Feb. 25, 1977 | [JP] | Japan | 52-21447[U] |
| Feb. 25, 1977 | [JP] | Japan | 52-21448[U] |
| Feb. 28, 1977 | [JP] | Japan | 52-23789[U] |
| Feb. 28, 1977 | [JP] | Japan | 52-23794[U] |
| Feb. 28, 1977 | [JP] | Japan | 52-23795[U] |
| Mar. 11, 1977 | [JP] | Japan | 52-25922 |

[51] Int. Cl.³ .......................................... H02K 11/00
[52] U.S. Cl. ............................... 310/68 B; 310/67 R; 310/90; 310/156; 310/194; 318/254; 324/174; 340/870.31
[58] Field of Search ............ 310/68 R, 68 B, 67, 310/75 R, 194, 112, 156, 114, 90, 89, 168–170; 318/138, 254 R, 254 A; 324/173, 174; 340/195, 196, 197, 671

[56] References Cited

U.S. PATENT DOCUMENTS

| 2,885,256 | 5/1959 | De Neergaard | 340/195 |
| 3,153,157 | 10/1964 | Rabe | 310/194 |
| 3,180,267 | 4/1965 | Bemmann | 310/43 |
| 3,445,697 | 5/1969 | Costa | 324/173 |
| 3,504,208 | 3/1970 | Rivers | 324/174 |
| 3,548,223 | 12/1970 | Dittrich | 310/46 |
| 3,644,765 | 2/1972 | Janson | 310/68 |
| 3,809,935 | 5/1974 | Kristen | 310/68 R |
| 4,028,958 | 4/1978 | Jones | 310/68 B |
| 4,059,015 | 11/1978 | Satori | 310/195 |
| 4,074,173 | 2/1978 | Janssen | 318/138 |
| 4,099,104 | 7/1978 | Muller | 318/138 |
| 4,115,715 | 9/1978 | Muller | 310/67 R |
| 4,125,792 | 11/1978 | Schmider | 318/254 A |

Primary Examiner—R. Skudy
Attorney, Agent, or Firm—Lewis H. Eslinger; Alvin Sinderbrand

[57] ABSTRACT

An electric motor comprising a stator block or assembly having stator windings and a control circuit substrate for supplying driving current thereto mounted integrally with the stator block, a shaft rotatably journalled in said stator block, a magnet casing in which are mounted driving magnets associated with the shaft, a rotor block or assembly provided with detector magnets held at an end of the shaft, and a detector winding block or assembly mounted within a motor housing to which a bracket is fixed. There is also disclosed a control means for controlling the driving current for the driving windings in response to the voltage induced in the detector winding block.

17 Claims, 35 Drawing Figures

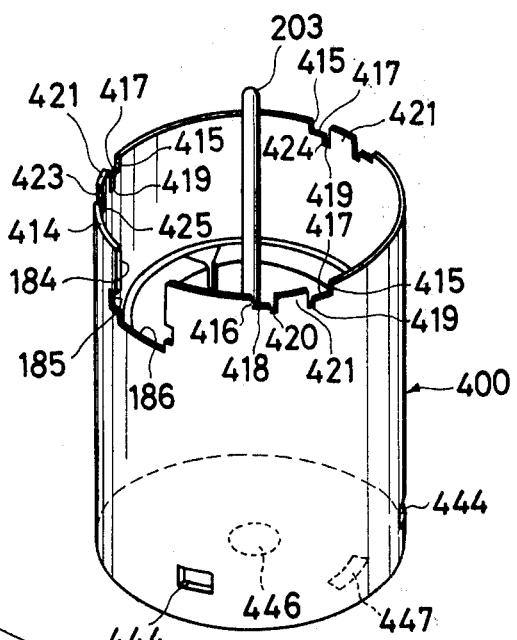
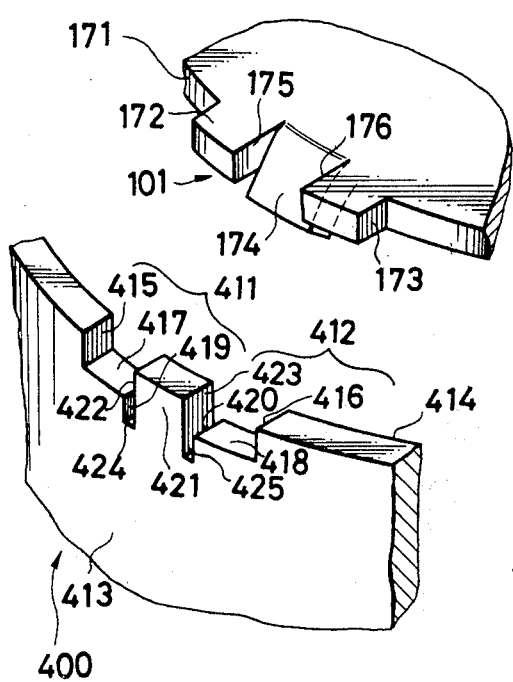
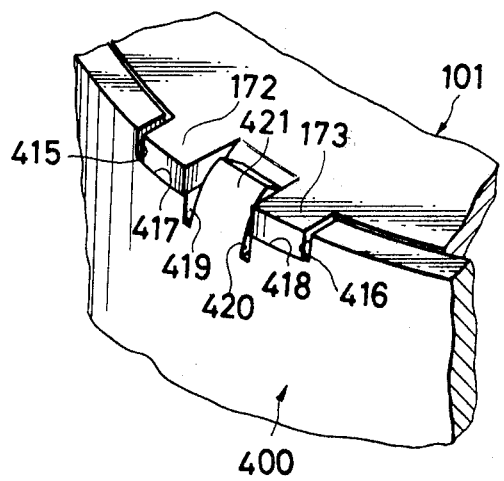

ELECTRIC MOTOR

BACKGROUND OF THE INVENTION

1. Field of the Invention

This invention relates to an electric motor and, more particularly, to such an electric motor in which speed detecting magnets are provided outside the bottom of a rotor casing and a speed detecting winding is provided concentrically with the detecting magnets and wherein the driving current of the motor is controlled by a voltage induced in the detector winding in response to the rotation of the detector magnets.

2. Description of the Prior Art

Tape drive capstans of tape recorders are generally driven by electric motors which ideally have a minimum fluctuation in rotational speed with a maximum service life. It has been the recent trend to employ brushless motors which do not have a commutator and brush for such purposes. However, in the conventional brushless motor, a motor torque generating section consisting of stator windings, rotor magnets and a detector element for detecting the rotational angular position of the rotor magnets is provided separately from a control circuit section which controls current supply to the stator windings in response to the detecting signals from the detector element. Such brushless motors also have a considerable number of lead wires for connecting the two sections. Thus it is tedious to assemble and connect such brushless motors and the space requirements necessary to accommodate such motors becomes prohibitive. It is also a problem in that the manipulation of such a motor is cumbersome.

There are also additional disadvantages in that, where such a conventional brushless motor is used as a servomotor, it is the practice to utilize the voltage induced in the driving windings by the rotation of the driving magnets of the rotor as the signals corresponding to the speed of rotation. This results in the fact that the induced voltage includes substantial ripple components due to fluctuation of driving current when the number of poles is small. The ripple components must be eliminated by the use of other means, thereby requiring a complex circuit structure. Further, the magnitude of the output of the induced voltage tends to be affected by temperature variation so that it is often difficult to control the motor speed with a high degree of accuracy. Notwithstanding the presence of these disadvantages, it is essential for high quality performance to control with absolute accuracy the rotational speed of electric motors employed in audio devices such as tape recorders and record players.

SUMMARY OF THE INVENTION

An object of the present invention is to provide a novel electric motor immune from the various disadvantages present in conventional electric motors.

Another object of the invention is to provide an electric motor in which assembling and connecting operations of the component blocks are easy to perform.

A further object is to provide an electric motor which is compact in size and is effectively mounted within a small space.

An additional object is to provide an electric motor which is effective in controlling the rotational speed thereof with an optimum accuracy without causing objectionable speed fluctuation.

A still further object is to provide an electric motor in which position detector elements for detecting the rotational position of the rotor are positioned with a high degree of accuracy with respect to the rotor windings.

Yet another object is to provide an electric motor in which rotor magnets mounted within a magnet casing are easily associated with the magnet casing.

Another object is to provide an electric motor in which a rotation detector section to be arranged within a motor housing is mounted therein in a simple manner, with each component part thereof being accurately positioned.

Another object is to provide an electric motor in which the motor housing is connected easily to a bracket to which is attached a circuit control substrate plate and which receives or supports the rotor and stator.

Another object is to provide an electric motor in which a bobbin wound with stator windings can be easily fitted by a simple fitting means to a bearing housing mounted integrally to the bracket, without resorting to adhesives or other attachment means.

Yet another object is to provide an electric motor in which the bobbin wound with rotor windings is detachably fitted in the bearing housing thereby assuring easy access to the control circuit plate for maintenance and inspection.

Further and other objects and advantages of the present invention will become apparent on reading the following description with reference to the accompanying drawings.

BRIEF DESCRIPTION OF THE DRAWINGS

FIG. 24 is a perspective view of a motor housing of an electric motor according to the present invention;

FIG. 25 is an enlarged perspective view of an essential part of the motor housing and bracket at the juncture thereof illustrating how they are positioned relative to each other;

FIG. 26 is an enlarged perspective view showing the motor housing and bracket as engaged together;

DESCRIPTION OF THE PREFERRED EMBODIMENTS

Figure 1:
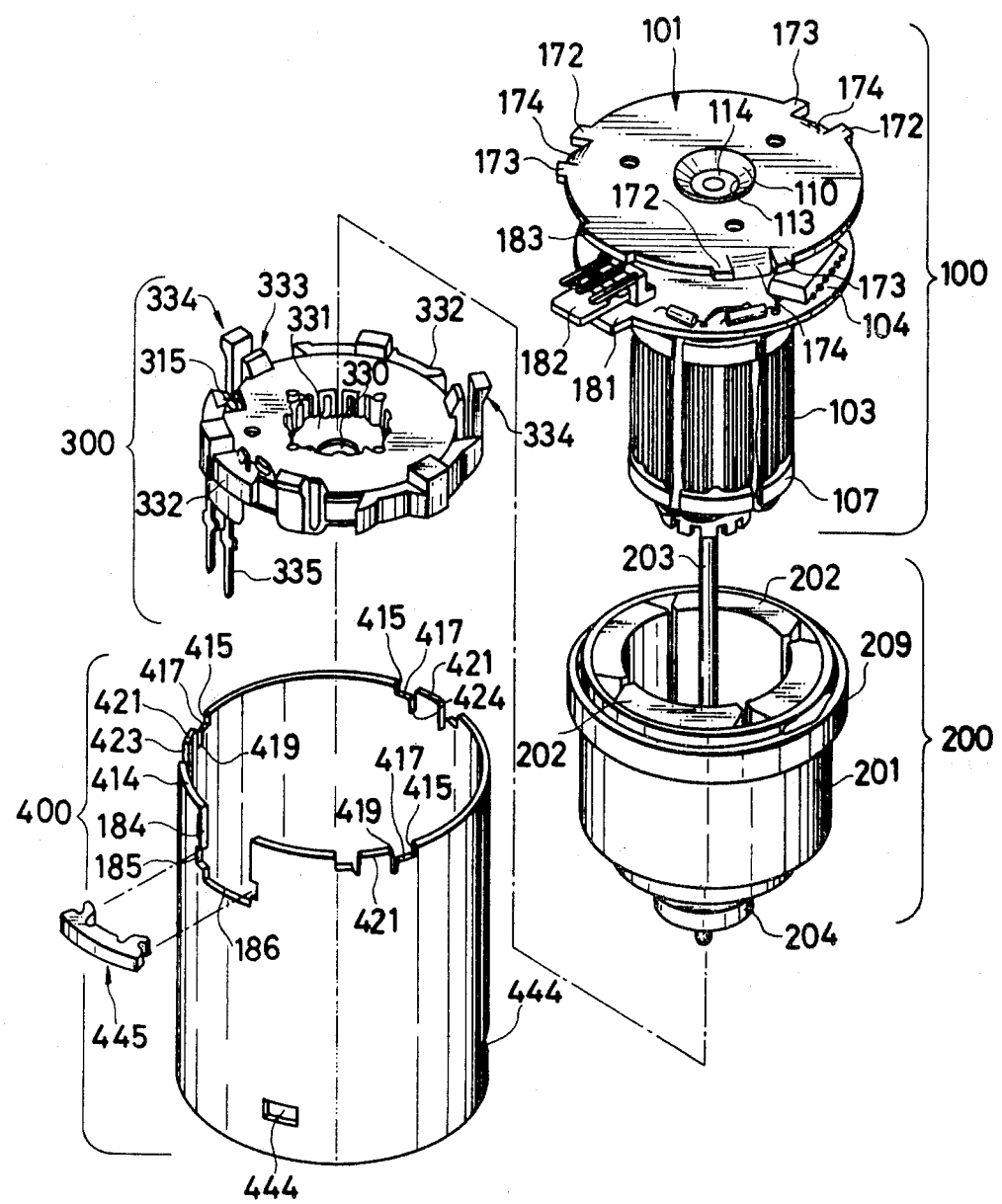
FIG. 1 is an exploded perspective view of an electric motor according to the present invention.

As seen in FIG. 1, an electric motor according to the present invention comprises a stator block or assembly 100, a rotor block or assembly 200, a detector winding block or assembly 300 and a motor housing 400.

Figure 2:
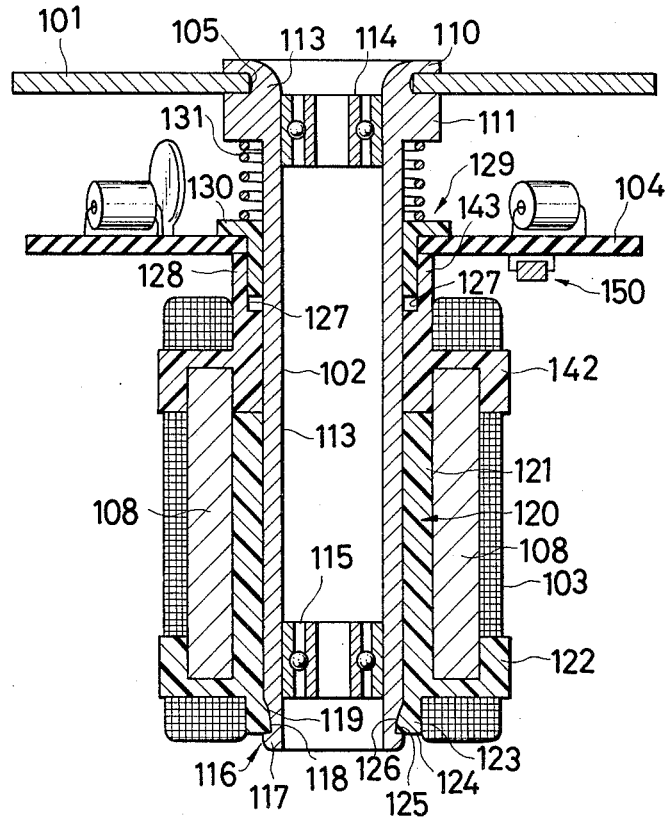
FIG. 2 is a schematic cross-sectional view illustrating the manner in which the stator block of the electric motor according to the present invention is assembled.
Figure 3:
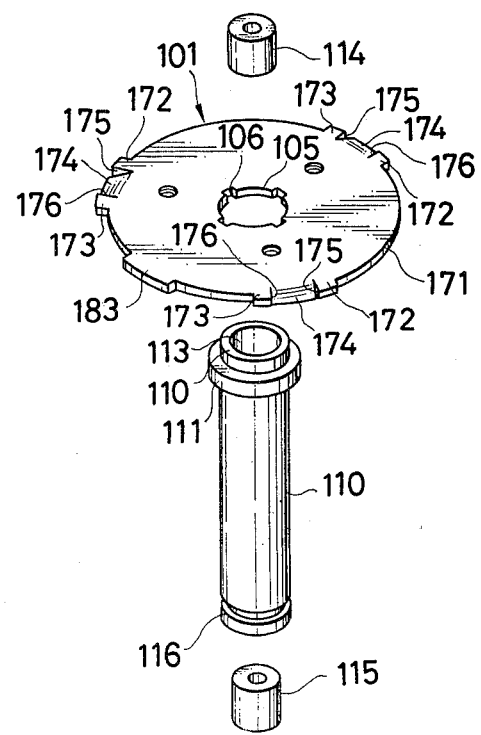
FIG. 3 is an exploded perspective view showing the manner in which the bracket forming part of a stator block is assembled with the bearing housing.
Figure 4:
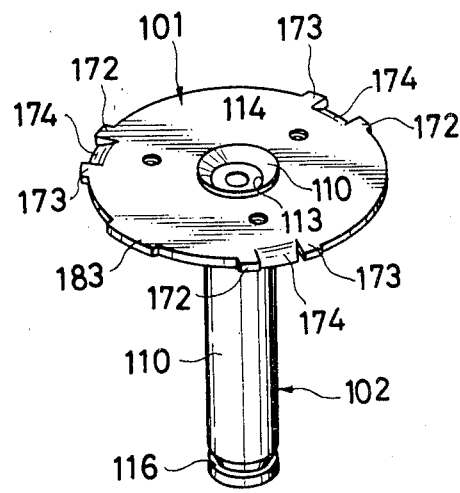
FIG. 4 is a perspective view of the bracket and bearing housing as assembled.

The stator block 100 best seen in FIG. 2 consists of a bracket 101 which is positioned within the motor housing 400, a bearing housing 102 press-fitted or clinched to bracket 101 at a central aperture 105, driving windings 103 wound over a bobbin 107 snap-fitted over bearing housing 102, and a control circuit substrate 104 mounted on a bobbin 107. Formed on central aperture 105 (FIG. 3) along the periphery thereof are provided a plurality of recesses 106 to assure smooth clinching of the bearing housing 102.

Bearing housing 102 is formed of a cylindrical portion 110 having a thin wall thickness defining a tubular opening 113 and at the upper portion there is formed a jaw 111 on which bracket 101 rests when cylindrical portion 110 is inserted through central aperture 105 of bracket 101. A pair of bearings 114 and 115, respectively, are press fit at each end of tubular opening 113 of bearing housing 102. The thin-walled cylindrical portion 110 of bearing housing 102 is forced to flare out laterally cooperating with jaw 111 whereby bracket 101 is gripped between them and is firmly clinched to the bearing housing 102.

An annular slot or groove 116 is provided at the opposite end of the bearing housing 102 along the exterior periphery thereof. Slot 116 has a hook-shaped cross-section. As is apparent from FIG. 2, annular slot 116 has a cross-sectional shape defined by a plane 117 perpendicular to the peripheral plane of bearing housing 102, a parallel plane 118 adjacent the plane 117 and an inclined plane 119 located next to the parallel plane 118.

Figure 5:
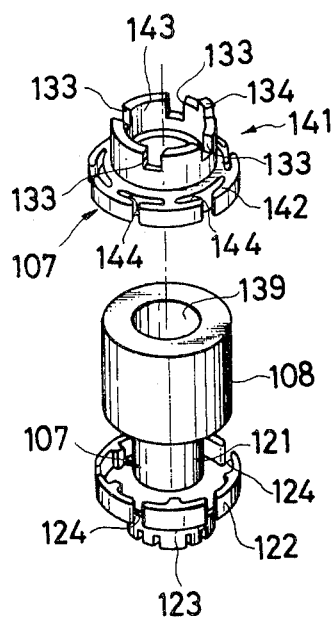
FIG. 5 is an exploded perspective view representing the manner in which a yoke is mounted relative to the bobbin forming part of the stator block.

As shown in FIG. 5, bobbin 107 which is mounted around bearing housing 102, includes a cylindrical portion 121 and a flange 122 extending outwardly from the cylindrical portion 121 with both of these being preferably made from a rigid material as required, such as bakelite or synthetic resins. At the lower end of the cylindrical portion 121, there are formed serrations 123 having an inner diameter slightly smaller than that of the cylindrical portion 121. As best seen in FIG. 2, serrations 123 have a cross-sectional configuration defined by a vertical plane 125, which is situated adjacent to a horizontal end surface 124 of cylindrical portion 121, and an outwardly inclined plane 126 contiguous thereto. An annular yoke 108, made from a resilient magnetic material and which is adapted to be wound with driving windings, is engaged within flange 122 and around the cylindrical portion 121.

Figure 6:
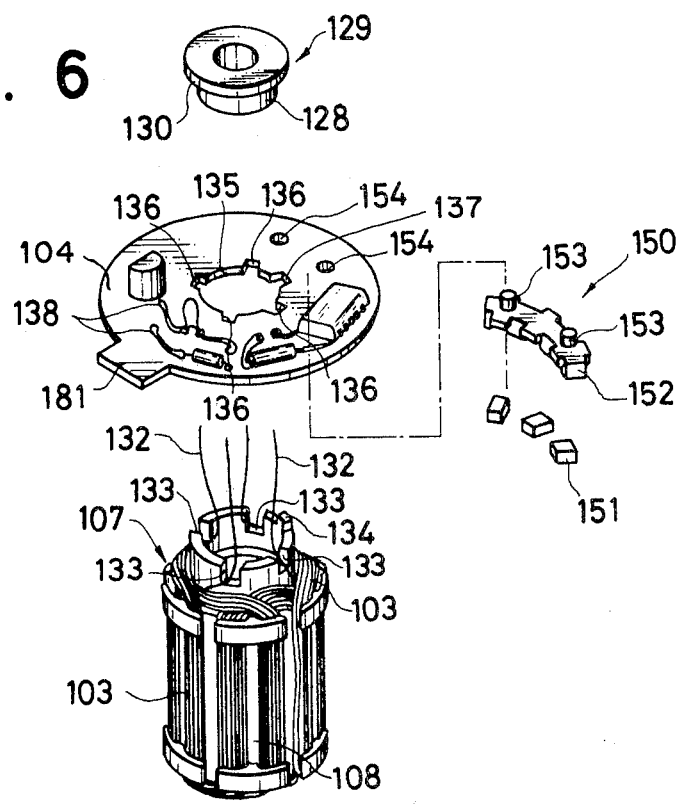
FIG. 6 is an exploded perspective view illustrating how the control circuit substrate is fitted with the bobbin forming part of the stator block.
Figure 7:
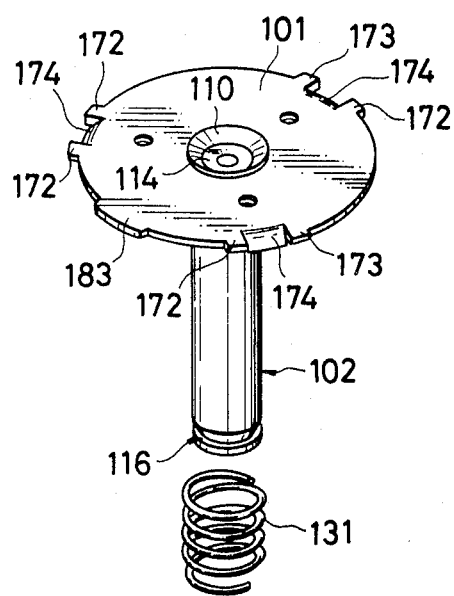
FIG. 7 is an exploded perspective view showing the manner in which the assembly of bracket and bearing housing is assembled with the assembly of bobbin and control circuit substrate.

A winding coil retainer member 141 (FIG. 5) is fitted at the other end of cylindrical member 121 of bobbin 107 opposite flange 122. Winding retainer member 141 includes a flange 142 and a tubular projection 143 and is engaged with the cylindrical portion 121 of bobbin 107 in such a manner as to cover the upper end of annular yoke 108, disposed about bobbin 107. Thus a bobbin 107 is formed on which driving windings 103 are wound. The driving windings 103 are wound over and through an undercut 144 of flange 142 of winding retainer 141, on the one hand, and over and through an undercut 145 of flange 122, on the other hand. Thus windings 103 are wound over flange 142 of winding retainer 141 and flange 122 located at the other end of the bobbin 107, as shown in FIG. 6.

The cylindrical portion 121 of bobbin 107 is assembled with control circuit substrate 104 by means of a holder 129 in such a manner that the opening 135 of the control circuit substrate 104 which has an inner diameter slightly greater than the outer diameter of holder 129 is first brought into registration with an annular recess 127 formed at the uppermost interior portion of the cylindrical portion 121. Annular recess 127 has an inner diameter slightly smaller than the outer diameter of holder 129 so that holder 129 is pressed down by the substrate 104 into the annular recess 127. The holder, on being inserted, is deflected in the inward direction and is resiliently held in the recess 127.

At the top of the winding coil retainer 141 a protrusion 134 is provided which is adapted to engage with a recess 137 of the control circuit substrate 104 whereby relative positioning of the plate 104 with respect to the bobbin can be assured.

The control circuit substrate 104 connected to the bobbin 107 in the manner described when compared with the conventional way in which adhesives or screws are used, provides certain advantages in that the assembling operation is made more simple and effective and maintenance and inspection can be easily conducted by disassembly of the circuit parts without undue difficulty.

In addition, a coil spring 131 is provided between the jaw 111 of the bearing housing 102 and a radially extending flange 130 of holder 129. The spring 131 urges the horizontal end surface 124 of the serrations 123 against the vertical surface 117 of the annular slot 116 absorbing unnecessary clearance of the bobbin 107 relative to the bearing housing 102 and assuring proper positioning between them. The vertical surface 117 and horizontal end plane 124 together form a reference plane of mount for these two parts.

Figure 8A:
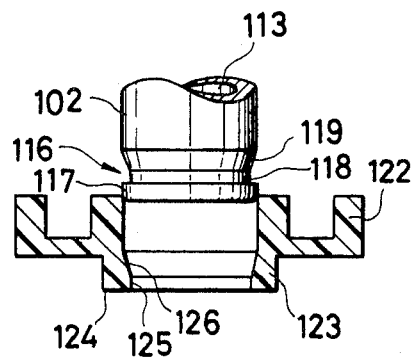
FIGS. 8(A)–8(C) are cross-sectional views illustrating the sequence in which the bearing housing is fitted within the bobbin.
Figure 8B:
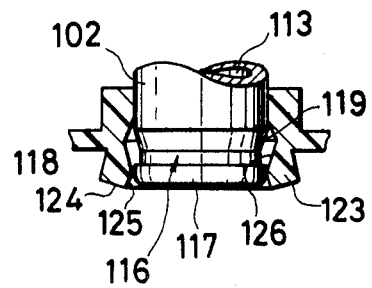
Figure 8C:
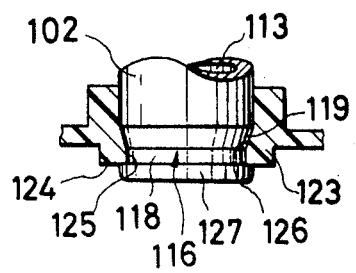

With reference now to FIGS. 8A-8C, a description will now be given to the sequence in which the bobbin 107 is mounted on the bearing housing 102. Spring 131 is first engaged about bearing housing 102 and housing 102 is then inserted from above into the bobbin 107. As this stage, the annular slot 116 faces against the serrations 123 as shown in FIG. 8A. On pressing the bearing housing 102 down against the action of the spring 131, the serrations 123 are brought into engagement with the lower end of the bearing housing 102 so that the inclined surface 126 is expanded outwardly, as shown in FIG. 8B. Upon further downward movement of housing 102, the serrations 123 resume their original position as they snap into the annular slot 116, as shown in FIG. 8C. After the engaging movement is completed, the bobbin 107 will be subjected to the action of the spring 131 so that the horizontal end surface 124 of serrations 123 bears against the vertical surface 117 of the annular recess 116. Thus, the position of the bobbin 107 in the thrust direction relative to the bearing housing 102 is maintained stable. This positioning of the bobbin 107 is accomplished simply and quickly without employing conventional adhesives or screws.

Easy connection of driving windings 103, which are wound over the bobbin 107, to the circuitry provided on the control circuit substrate 104, is accomplished through the assembly of circuit substrate 104 and bobbin 107 in the manner described below. The top of the cylindrical winding retainer 141 includes four recesses 133 corresponding to the number of leads 132 (FIG. 6) of the driving windings 103. Each recess 133 extends in the longitudinal direction to form an opening through the tubular portions 143 of retainer 141. As noted above, at least one projection 134 is provided at the top of the retainer 141 and it fits within recess 137 which has a size substantially equal to that of the projection 134 to accommodate that projection. Four additional recesses 136 are provided along the inner periphery of opening 135 of control circuit substrate 104 in such a manner as to face with the four recesses 133. Control circuit substrate 104 is mounted on the bobbin 107, with recess 137 engaging the projection 134 to properly locate substrate 104 with respect to the bobbin 107. Thus, the recesses 133 of bobbin 107 are located in proper registration with the recesses 136 of the control circuit substrate 104 to form passages from the outer area of the bobbin to the area above substrate 104. In assembly, the leads 132 of the driving windings 103 are first drawn together through the recesses 133 of the winding retainer 141 toward the interior of the tubular portion of winding retainer 141 and are passed through aperture 135 of control circuit substrate 104. After projection 134 is engaged within recess 137 of substrate 104, leads 132 appear above the control circuit substrate 104 via the passages formed by the recesses 133 and recesses 136 on substrate 104 thereby enabling soldering of leads 132 to a printed circuit 138 provided on control circuit substrate 104.

Figure 9:
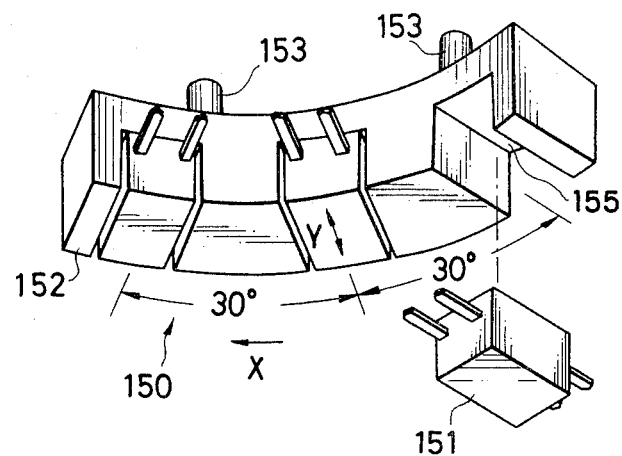
FIG. 9 is a perspective view, partly exploded, of a holder for supporting Hall elements.
Figure 10:
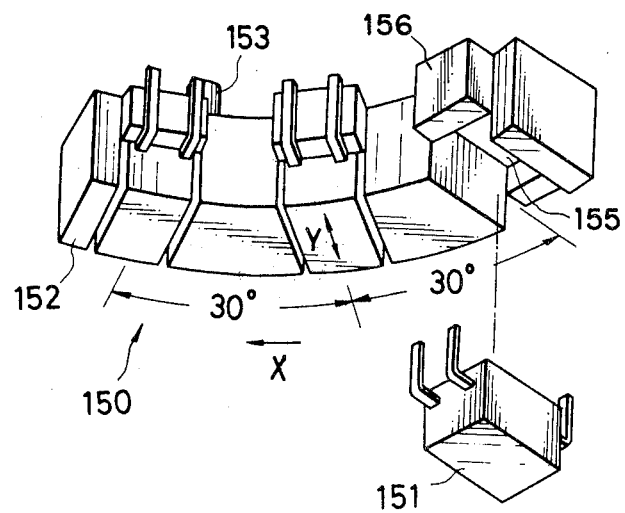
FIG. 10 is a view similar to FIG. 9 but illustrating another embodiment of Hall element holder.

The control circuit substrate 104 is also provided with a position detector assembly 150 for detecting the rotational position of the rotor magnets arranged within the rotor block 200 (See FIGS. 9 and 10). The position detector assembly 150 includes three Hall position detector elements 151 mounted on the control circuit substrate 104 by a holder 152. Control circuit substrate 104 is provided with a pair of positioning holes 154 (FIG. 6) which receive positioning pins 153 extending from holder 152. The positioning holes 154 are located in a predetermined positional relationship with respect to recess 137 which engages projection 134 of winding retainer 141. Holder 152 serves to support the three Hall elements 151 in a relationship equally angularly spaced apart from each other at an angle of 30° as well as in a predetermined positional relationship relative to the control circuit substrate 104. In other words, the holder 152 is provided with three recesses 155 for locating the Hall elements 151 which are arranged in sequence at 30° in the direction X indicated by the arrow in FIGS. 9 and 10 of the drawing. Positioning pins 153 are also located in a predetermined position with respect to these recesses 155. It is also necessary to assure the proper positioning of Hall elements 151 in a radial direction, e.g., in the direction of arrow Y of the drawing, if they are to face with the end surface of the rotor magnets. To this end, holder 152 is provided with stop elements 156 (FIG. 10) to which the Hall elements 151 are secured to prevent radial displacement of the elements.

After Hall elements 151 are located and fixed in recesses 155 of holder 152, and positioning pins 153 are located in positioning holes 154 of control circuit substrate 104 to fix holder 152 on substrate 104, the Hall elements are properly positioned in a predetermined angular and radial relationship with respect to the control circuit substrate 104.

As the relative position between the positioning holes 154 and recess 137 is fixed on control circuit substrate 104, Hall elements 151 are positioned correspondingly in a predetermined relationship relative to bobbin 107, simply by engaging projection 134 with recess 137 to assembly substrate 104 relative to bobbin 107. Since bobbin 107, as described above, supports yoke 108 wound with driving windings 103 and, in addition, since the relative position between driving windings 103 and bobbin 107 is fixed, the Hall elements 151 will automatically be mounted in a given fixed position with respect to the driving windings 103. The radial position of the Hall elements is also fixed in such a position as to enable normal detection of the magnetic poles of the rotor magnets.

As is clear from the foregoing description, the positions of Hall elements 151 are fixed with respect to the driving windings 103 in a given positional relationship through holder 152, control circuit substrate 104 and bobbin 107. Thus, since positioning has been made with a high degree of accuracy between the recesses 155 of the holder 152, the positioning pins 153, projection 134 and the driving windings 103, positioning of the Hall elements 151 and the driving windings 103 is obtained automatically with corresponding high accuracy by a simple assembly operation.

Figure 11A:
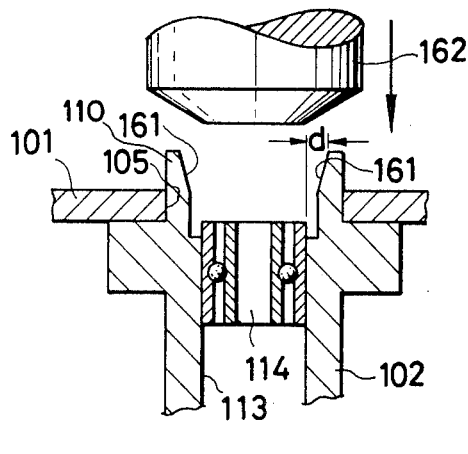
FIGS. 11(A) and 11(B) are cross-sectional views of essential parts showing the manner in which the bearing housing is secured to the bracket.
Figure 11B:
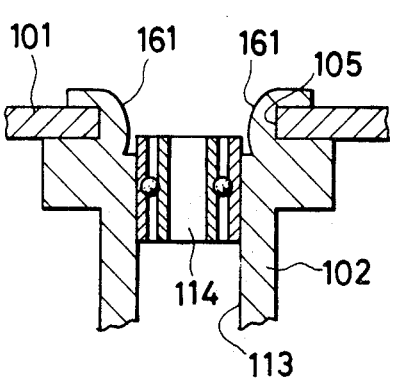

Bearings 114 and 115, which support shaft 203 of rotor block 200, are press fit within tubular opening 113 of bearing housing 102 at either end thereof, respectively. Preferably, upper bearing 114 is placed as close to the uppermost position of the bearing housing as possible where the bearing housing is clinched to bracket 101, in order to reduce the length of the free end of shaft 203 which extends beyond the bearing to avoid the effect of eccentric load caused by pulley and the like. However, the inner race of bearing 114 may be subjected to strain developed by the clinching operation and may tend to detract from the smooth rotation and support of shaft 203. To avoid this possibility, a stepped portion 161 (FIGS. 11A and 11B) is formed at an end of bearing housing 102 where the clinching is effected. Stepped portion 161 has an inner diameter larger than the outer diameter of the bearing 114 and 115 so that a clearance of d (FIG. 11A) is maintained between tubular opening 113 and cylindrical portion 110 as illustrated in FIG. 11A. The clinching operation is carried out using a forming tool 162 in such a manner as to expand the end of the bearing housing 102 to fold the end of the bearing housing over bracket 101 (See FIG. 11B). During the course of clinching, the inner diameter of stepped portion 161 is not reduced beyond the bore of the bearing housing 102 and, thus, no strain is imparted to bearing 114. Thus, smooth rotation and support of shaft 203 is ensured by the bearings 114 and 115.

Figure 12:
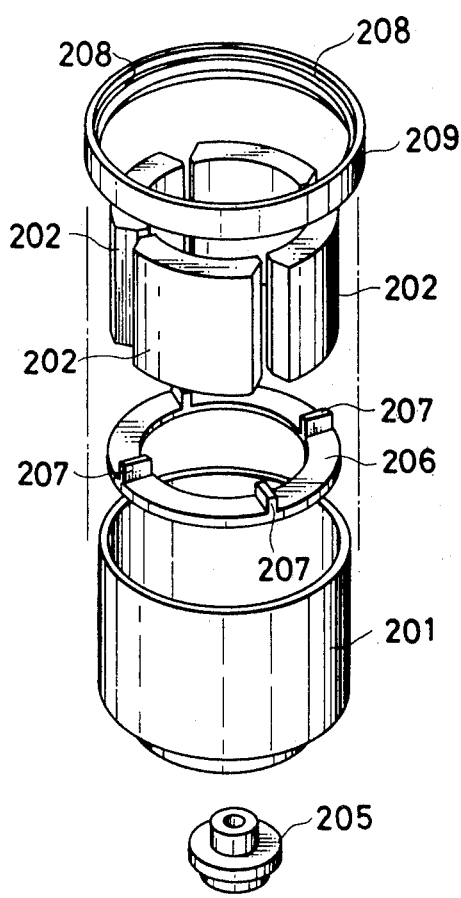
FIG. 12 is an exploded perspective view of the rotor block according to the present invention.
Figure 13:
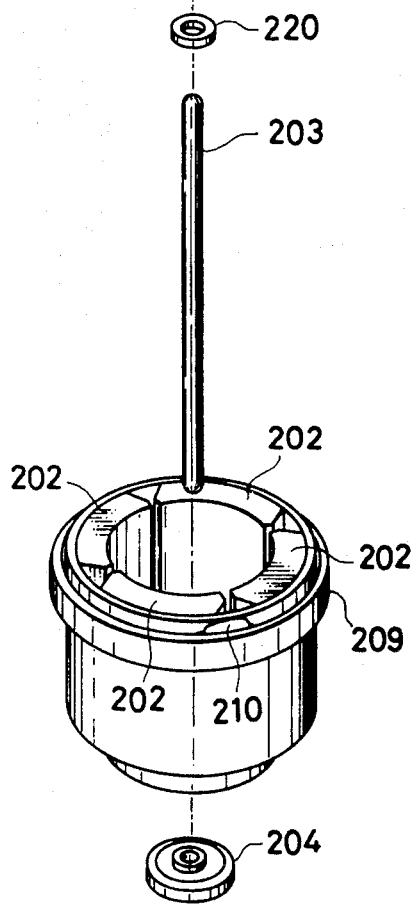
FIG. 13 is a perspective view thereof as assembled.

As shown in FIGS. 12 and 13, rotor block or assembly 200 comprises a magnet casing 201 of iron alloy, a series of four spaced-apart driving magnets 202 mounted in magnet casing 201, a shaft 203 carrying a washer 220 and a detector magnet 204 mounted on shaft 203 outside magnet casing 201. A holder 205 to support shaft 203 is mounted at the bottom of magnet casing 201. Magnets 202 are supported in magnet casing 201 in equally spaced orientation by a magnet holder 206 which is press fitted into the bottom of magnet casing 201. Adhesives are preferably also applied to magnet holder 206 in order to ensure a solid securement to magnet casing 201. Magnet holder 206 has an annular configuration and is provided with four upstanding projections 207 equidistantly spaced apart from each other to separate driving magnets 202 which are placed upon annular holder 206 between adjacent projections 207. An adhesive is applied to secure the magnets to magnet casing 201. After magnet holder 206 and driving magnets 202 have been assembled in magnet casing 201, a balance ring 209 having an annular groove 208 is mounted along the periphery of the magnet casing 201. Groove 208 is intended to receive balance weights 210 (FIG. 13) for balancing the rotation of the rotor block. To complete the assembly, shaft 203 is passed through holder 205 secured to magnet casing 201 and an end of holder 205 is appropriately secured to magnet casing 201 to fix shaft 203 to magnet casing 201. Detector magnet 204 is then fitted on shaft 203 outside the magnet casing bottom to obtain a rotor block 200.

Final assembly of rotor block 200 may be done in one of a number of alternative ways as shown in FIGS. 14–18.

Figure 14:
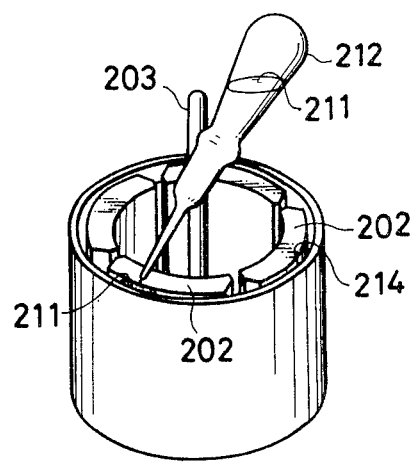
FIG. 14 is a perspective view illustrating the manner in which the magnets are fixed within the magnet casing of the rotor block.
Figure 15:
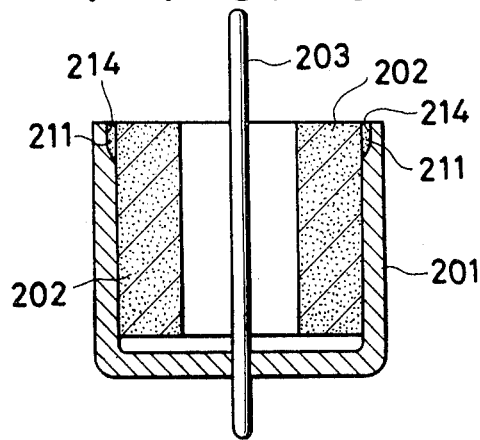
FIG. 15 is a cross-section of the magnets and magnet casing as assembled.

As shown in FIG. 14, an annular recess 214 is provided interiorly of the opening of the magnet casing 201 so that, when magnets 202 are mounted in magnet casing 201, an annular space is formed between magnets 202 and the casing. An adhesive 211, which may be an epoxy resin which sets at ambient temperatures is filled into the annular space by means of a filler 212. In this way, the adhesive 211 is interposed between the magnet casing 201 and magnets 202 in the annular space 214. The adhesive is set in situ thereby assuring a solid bonding of the members, as shown in FIG. 15.

Figure 16:
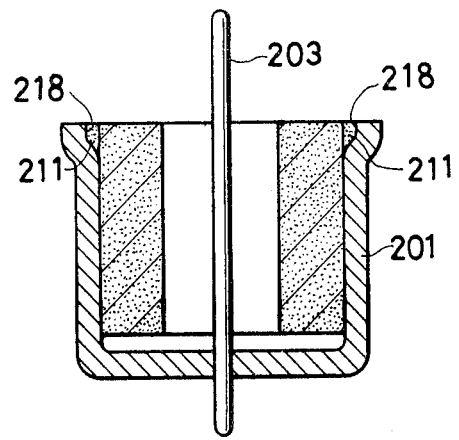
FIGS. 16–18 are cross-sectional views of alternate embodiments showing mounting magnets in the magnet casing.
Figure 17:
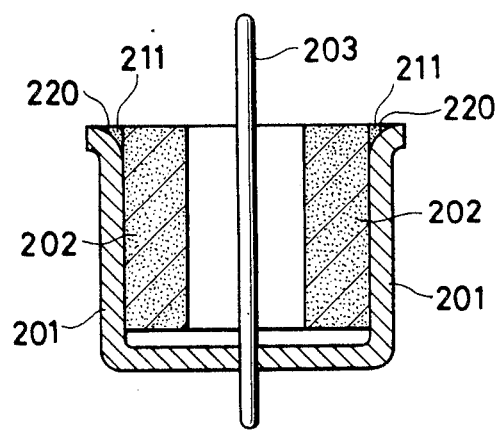

In an alternative form, the end portion of the magnet casing 201 is subjected to step forming so as to form a stepped groove 218, as shown in FIG. 16, by which an annular space is left between the magnet casing 201 and magnets 202. The adhesive 211 is filled therein in the manner as above described. Similarly, step forming is conducted in such a way that the end portion of magnet casing 201 flares outwardly to provide a groove 220, as shown in FIG. 17, which is filled with adhesive 211.

Figure 18:
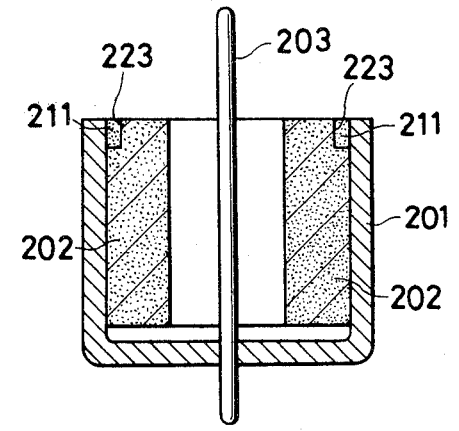
Figure 19:
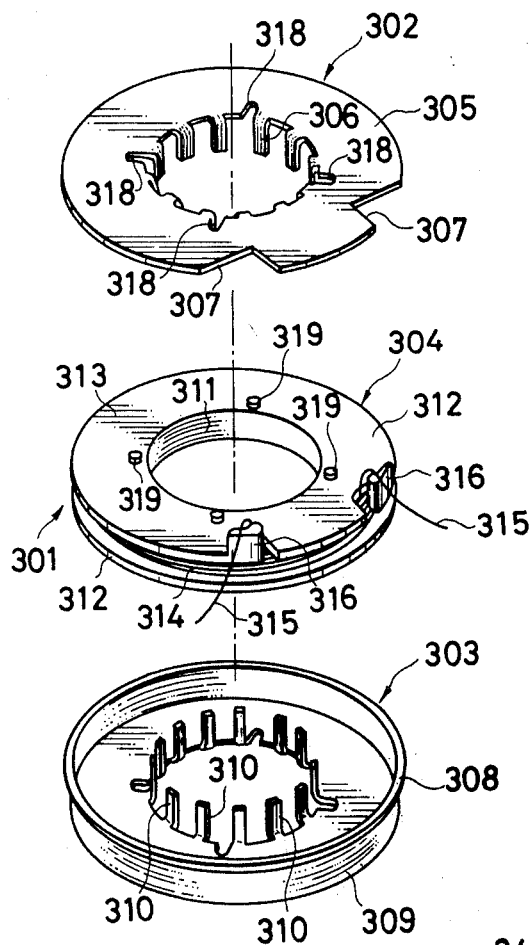
FIG. 19 is an exploded perspective view showing the structure of the detector block of the electric motor according to the present invention.
Figure 20:
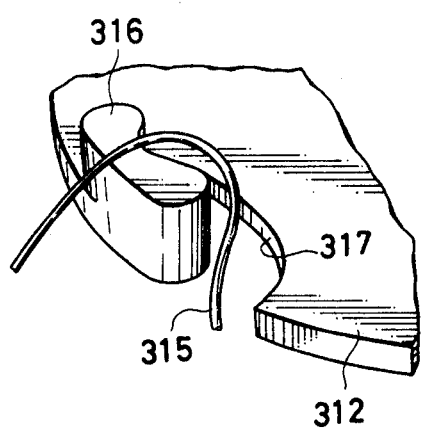
FIG. 20 is an enlarged perspective view of a guiding projection provided on the flange of a hub of the detector block.
Figure 21:
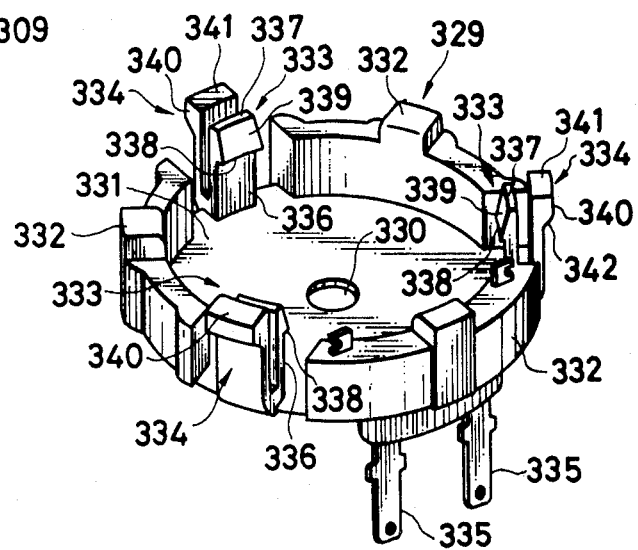
FIG. 21 is a perspective view of a holder for the above-mentioned detector block.

In another embodiment, an annular recess 223 is formed on the exterior of magnets 202 adjacent the end of magnet casing 201, as shown in FIG. 18. This may be done as an alternative to providing an annular space in the magnet casing per se. Adhesive 211 is applied in recess 223 in the same manner. Alternatively, the corner of the magnets 202 may be machined off to provide an annular recess. In each embodiment, the adhesive 211 is effectively interposed or inserted between the magnets 202 and magnet casing 201 without leaving a mass of adhesive on the surface of these parts and without impairing the appearance thereof. Moreoever, as it is possible to eliminate the step of drying and setting of adhesive, the time requirement for assembly is reduced and dirt and dusts are prevented from adhering. In addition, it is possible to eliminate or reduce space requirements for the storage of the parts in the drying and setting stage, to reduce the overall cost of the motor.

With reference to FIGS. 19–23, the detector winding block or assembly 300 will now be described. The rotation detector section 301 forming part of the detector winding block 300 includes a plate-like core 302, another core 303 having a housing-like shape and a winding portion 304 interposed between them. Both the plate-like core 302 and housing-like core 303 are made from a metal of ferromagnetic material. Plate-like core 302 includes an annular plate 305, the central portion of which is cut out to form rectangular poles 306 which are turned down so as to face the housing-like core 303. Along the circumferential periphery of annular plate 305 a pair of recesses 307 are provided to accommodate leads extending from the winding portion 304. The housing-like core 303 comprises a hat-shaped housing 309 having an annular flange 308 and a central portion of housing 309 is also cut out to form rectangular poles 310 which are turned up to face plate-like core 302.

The winding portion 304 comprises a bobbin 313 having a hub 311 of non-magnetic material such as porcelain or synthetic resins and is formed to include a pair of flanges 312 provided at both ends of the hub 311. A winding 314 is wound around hub 311.

At the positions corresponding to recesses 307 of plate-like core 302, one of the flanges 312 is provided with a pair of guiding projections 316 for guiding the end 315 of the leads from winding 314. An undercut 317 (FIG. 20) is formed on flange 312 in the vicinity of each of the guiding projections 316 to accommodate passage of end 315 of the leads from the inside toward the outside of the flange 312. Along the inner opening of annular plate 305, there are provided four positioning recesses 318 spaced so that three of the poles 306 are between each pair of recesses 318. Uppermost flange 312 is provided with four positioning projections or pins 319 which correspond, respectively, to the positioning recesses 318, so that when winding portion 304 is received in housing-like core 303 and plate-like core 302 is placed thereover, the positioning pins 319 engage within recesses 318 thereby fixing the position of winding portion 304 relative to core 302.

When plate-like core 302, housing-like core 303 and winding portion 304 are assembled together, poles 306 of core 302 and poles 310 of core 303 are arranged alternately and equidistantly from each other, and the relative position of these poles with respect to the winding portion 304 is determined. The ends 315 of leads are passed out through undercuts 317 along the inner surface of guiding projections 316 in such a way as to avoid contact with plate-like core 302.

The rotation detector section 301 thus constructed and assembled is fitted within a holder 329 (FIG. 21) molded from an insulating material such as a synthetic resin. The holder 329 comprises a disk portion 331 having a depression 330 formed at its center and a plurality of spaced protective walls 332 formed integral to and upstanding from disk 331 which serve to protect and support the outer periphery of the rotation detector section 301 when it is assembled in holder 329. The holder also includes a number of detent levers or arms 333 for securing rotation detector section 301 located between adjacent protective walls 332, and a number of latching segments 334 provided in a face-to-face relationship with detent levers or arms 333 for engagement with motor housing 400. A pair of terminal lugs 335 are inserted in one of the protective walls 332, with one of the ends of the lugs extending from the lower surface of the wall and the other from the upper surface. The upper end of each lug 335 is adapted to be connected by soldering or the like with a respective lead 315 of winding 314 of rotation detector section 301.

The detent levers 333 are located at three equidistantly spaced apart locations, and the inner surface of each detent is formed with an arcuate surface 336 along the trajectory of an arc of a circle having a selected radius substantially the same as the outer diameter of plate-like core 302 and that of flange 308 of housing-like core 303 of rotation detector section 301. Each of the detent levers 333 is provided at its top with a pawl 337 projecting inwardly having a bearing surface 338 which, as measured from the upper surface of disk 331, is selected substantially equal to the thickness of flange 308 of rotation detector section 301. Each detent lever 333 is also provided with an inclined surface 339 contiguous to bearing surface 338.

Latch segments 334 are situated, respectively, radially outwardly of the detent levers 333 and include a latching pawl 340 provided at the top of each segment 334 to project radially outwardly. The upper surface of each latch segment 334 includes a flat bearing surface 341 and the lower surface, an inclined surface 342 adjacent surface 341. The outer diameter across latching segments 334 is selected to be substantially equal to the inner diameter of motor housing 400 and, hence, the outer diameter across the outermost end of latching pawls 340 is larger than the inner diameter of motor housing 400. Both of the detent levers and latching segments are made from a resilient material.

Figure 22A:
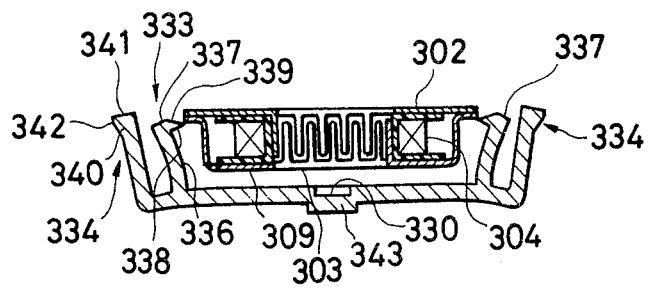
FIGS. 22(A) and 22(B) are cross-sectional views showing the manner in which a rotation detector section is fitted in the holder.
Figure 22B:
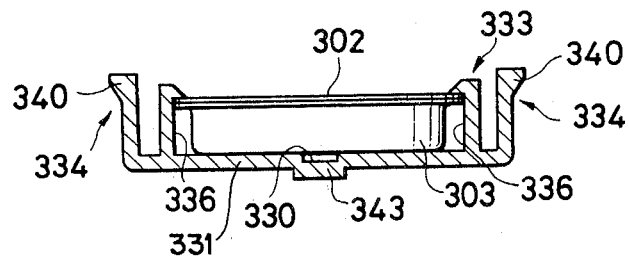
Figure 23:
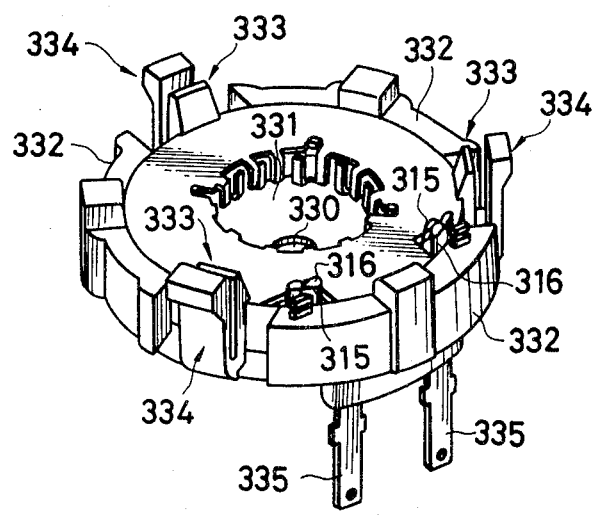
FIG. 23 is a perspective view of the rotation detector section and holder as assembled.
Figure 27A:
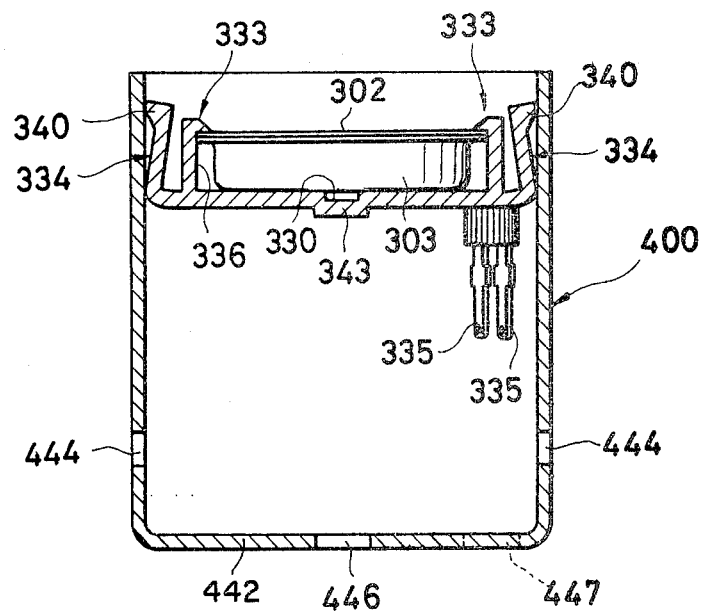
FIGS. 27(A) and 27(B) are cross-sectional views representing the sequence of assembly of the rotation detector section and motor housing.
Figure 27B:
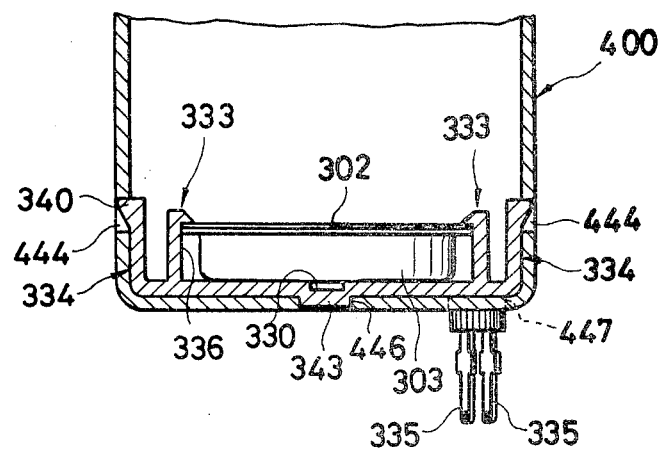
Figure 28:
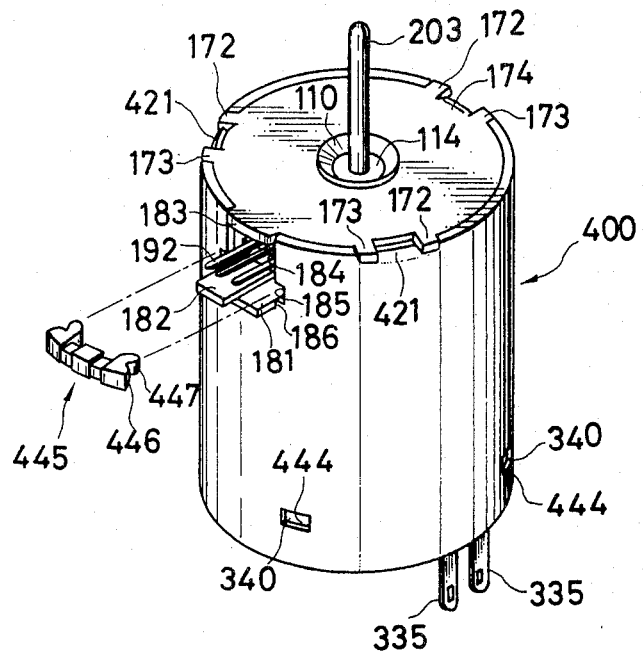
FIG. 28 is an exploded perspective view showing the manner in which a stopper is attached to the motor housing assembled with a bracket.
Figure 29:
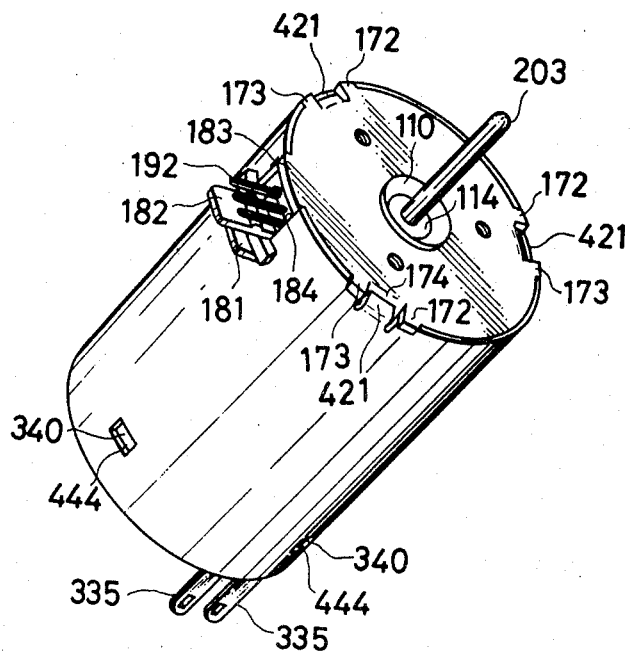
FIG. 29 is a perspective view of an electric motor according to the invention as completed by assembling all the component parts thereof.
Figure 30:
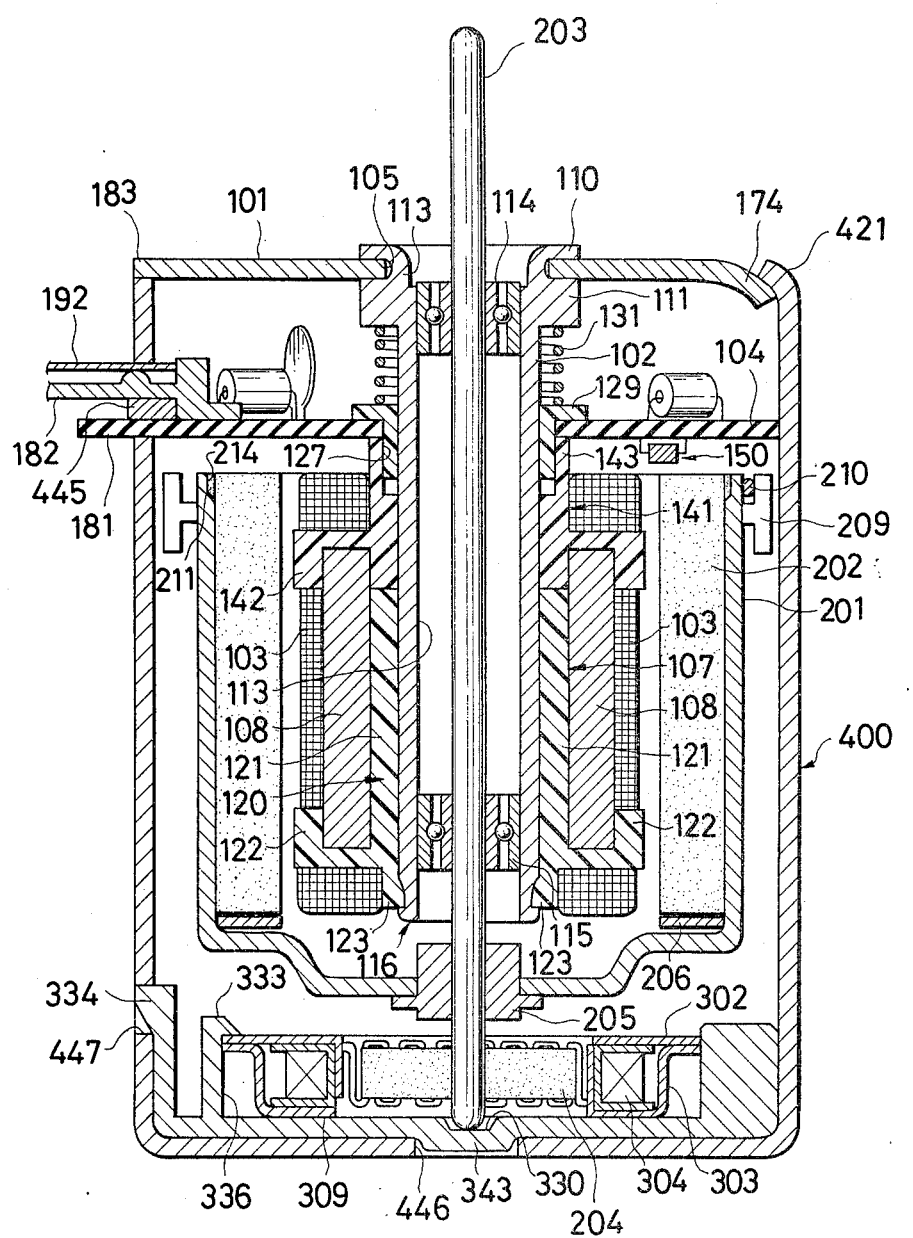
FIG. 30 is a cross-sectional view thereof.

To mount assembled rotation detector section 301 in holder 329, rotation detector section 301 is first placed in housing-like core 303 and plate-like core 302 is placed atop them. The thus preassembled parts are placed on holder 329 to seat on the latching pawls 337 and is then pressed downwardly toward disk 331. Flanged housing 309 of housing-like core 303 engages the inclined surfaces 339 of detent lever pawls 337 causing them to move outwardly (FIG. 22A). On continuing the downward movement, the bottom surface of housing 309 abuts against the upper surface of disk 331 and detent levers 333 return to their original position thereby retaining the periphery of the plate-like core 302 by engagement of bearing surface 338 on annular plate 305. Thus, rotation detector section 301 is positioned and secured with respect to holder 329 with the vertical and lateral position thereof being fixed in a predetermined location (FIGS. 22B and 23).

With reference now to FIGS. 24–30, a description will now be given with respect to motor housing 400 in which is received stator block 100, rotor block 200 and detector winding block 300 and to which bracket 101 of stator block 100 is attached at its upper end to form a unitary electric motor.

Motor housing 400 includes a substantially cylindrical peripheral wall section 413 having an end surface 414 on which bracket 101 of stator block 100 is mounted. To secure bracket 101 to motor housing 400 there is provided at three equispaced areas a pair of recesses 411 and 412 which straddle a projection 421. The recesses 411 and 412 are defined by a pair of opposite vertical surfaces 415 and 416, a pair of horizontal surfaces 417 and 418 contiguous to vertical surfaces 415 and 416, and a pair of vertical surfaces 419 and 420 contiguous to horizontal surfaces 417 and 418. Projection 421 is defined by end surface 414 of wall 413 and a pair of vertical surfaces 422 and 423 and horizontal surfaces 424 and 425 which are further from end surface 414 than horizontal surfaces 417 and 418.

At the outer periphery of the bracket 101, there are provided at each of three equispaced areas a pair of spaced projections 172 and 173. An intermediate portion 174 originally formed integral with projections 172 and 173, is formed by undercuts 175 and 176 and is turned downwardly to present an inclined surface. The arcuate extent from the outside of projection 172 to the outside of projection 173 is substantially equal to the distance between the vertical surfaces 415 and 416 in motor housing 400. The outer diameter of the bracket 101 is substantially equal to the inner diameter of wall 413 of motor housing 400 with the radial extent of projections 172 and 173 being substantially coextensive with the periphery of wall 413. The arcuate extent of projections 172 and 173 is substantially equal to the arcuate extent of horizontal surfaces 417 and 418 so that projections 172 and 173 fit within recesses 411 and 412. The end surface of the inclined intermediate portion 174 is slightly retracted from the outer periphery of the projections as viewed from the center of the bracket in such a manner that when bracket 101 is attached to motor housing 400, it abuts the inner surface of the peripheral wall 413. In assembly, bracket 101 is placed on motor housing 400 so that projections 172 and 173 are fitted, respectively, within recesses 411 and 412 with the lower surface of the projections bearing against horizontal surfaces 417 and 418 of motor housing 400. During this step, the end of intermediate portion 174 of bracket 101 is moved downwardly keeping contact with the interior surface of the projection 421 and, at the end of this step, is brought to the vicinity of the base portion of projection 421 of motor housing 400. Then projection 421 is turned inwardly until it comes into good structural contact with the inclined surface of intermediate portion 174.

With bracket 101 secured to motor housing 400, the positioning in the radial direction of bracket 101 relative to housing 400 is assured by the contact of the inner surface of peripheral wall 413 with the peripheral surface of bracket 101, the position in the circumferential direction being determined by the contact between vertical surfaces 415 and 416 of wall 413 and the left-hand surface of the projection 172 and the right-hand surface of the projection 173, as viewed in FIG. 26. Similarly, the positioning in the thrust direction is effected by the contact between the lower surface of projections 172 and 173 and horizontal surfaces 417 and 418 of peripheral wall 413 of motor housing 400. Accordingly, the accuracy of predetermined location of these cooperating surfaces is maintained thus ensuring a desired positional relationship of rotor block 200 and stator block 100 with respect to motor housing 400. As the projection 421 is turned toward inclined portion 174 around the close vicinity of the point where the bracket is supported, it is preferable to insulate the bracket from the operation against undesirable stress or deformation.

The motor housing 400 is also provided with a structure for preventing rotation of the control circuit substrate 104 engaged with bobbin 107 with respect to bearing housing 102.

A tongue 181 (FIGS. 28-30) is provided extending from the circumferential periphery of control circuit substrate 104. Secured to tongue 181 is a connector 182 or the like for supplying electric power to the control circuit arranged on control circuit substrate 104. Bracket 101, on which bearing housing 102 is clinched, is also provided with a tongue 182 extending from its circumferential periphery. The radial extent of tongue 183 is coextensive with the exterior surface of motor housing 400.

To accommodate tongues 181 and 183 a recess 184 is formed in motor housing 400 having a width substantially corresponding to that of the width of tongue 183. Near the lower surface 186 of recess 184 cutouts 185 are formed to provide an opening effectively wider than the width of recess 184. Tongue 181 is supported on lower surface 186 of recess 184 after assembly and extends outwardly from the exterior surface of motor housing 400 to preclude relative rotation of bearing housing 102, control substrate 104 and bobbin 107 with respect to motor housing 400.

Thus, after assembly, tongue 181 of control circuit substrate 104 is positioned in recess 184 of motor housing 400 whereupon connector 182 is secured in place.

It is thus evident that the three components of the motor are assembled in a simple manner by way of the foregoing arrangement. Accordingly, in the event that a failure occurs in the internal structure or circuitry, the motor may be easily disassembled by the simple operation of lifting projections 421 for the repair and replacement of any defective parts, thereby assuring an easy quality control. It will also be understood that the projections 172 and 173 of the bracket 101 received in the recesses 411 and 412 precludes movement of bracket 101 while tongue 181 of control circuit substrate 104 fixed within recess 184 precludes movement of the control circuit substrate.

When control circuit substrate 104 is assembled within motor housing 400, tongue 181 of substrate 104 and connector 182 extend exteriorly of motor housing 400. As another connector from a remote power source circuit is connected to or disconnected from connector 182, the area adjacent tongue 181 to which connector 182 is secured will be subjected to a relatively large applying force caused by the connection and disconnection of the other connector. Because control circuit substrate 104 is held against bracket 101 only by coil spring 131, the engagement of tongue 181 in recess 184 may not be firm enough to sustain the applying force, thereby resulting in a longitudinal displacement tending to cause damage thereof or causing loss to the concentric relation with bearings 114 and 115. Therefore, the present invention contemplates the use of a stopper 445 to maintain the position, particularly in the thrust direction, of control circuit substrate 104. Stopper 445 (FIG. 28) is fitted in the cutouts 185 after the control circuit substrate-bracket assembly is mounted on the motor housing 400 as described above. The stopper 445 is formed from a rigid synthetic resin material having some resilience, has a substantially U-shaped configuration with leg members 447 and is provided at each lateral side of legs 447 with smooth recesses 446 for engagement with the periphery of cutouts 185. The distance between legs 447 of stopper 445 is substantially equal to the width of connector 182. With the foregoing structure, when stopper 445 is snapped into cutouts 185 of recess 184 so that recesses 446 engage the end surfaces of cutouts 185, the tongue 181 of control circuit substrate 104 is thus retained between stopper 445 secured in cutouts 185 and surface 186 of recess 184. Legs 447 of stopper 445 grip both sides of connector 182 so that control circuit substrate 104 and connector 182 are firmly secured to motor housing 400.

As noted above, detector winding block 300 is mounted at the bottom of motor housing 400 to which bracket 101 of stator block 100 is secured. The detector winding block 300 is assembled to the motor housing in the following manner.

Side wall 413 of the motor housing is provided with circumferentially spaced openings 444 for cooperative engagement with latching pawls 340 of holder 329 of detector winding block 300. An opening 447 is formed in the bottom wall 442 of motor housing 400 to accommodate terminal lugs 325 connected to holder 329. To put holder 329 (FIGS. 27A and 27B) of the detector winding block in position within motor housing 400, holder 329 is first brought into alignment with motor housing 400, with the bottom surface of holder 329 facing bottom wall 442 of housing 400, and is then pressed down. When inclined surfaces 342 of latching pawls 340 come into engagement with the open end of motor housing 400, the latching pawls 340 are retracted inwardly along the periphery of housing 400, latching segments 334 are concurrently displaced toward the inside of housing 400. Holder 329 is further moved down into housing 400 until a bottom projection 343 provided at the center of disk portion 331 opposite depression 330 fits within an aperture 446 and abuts against bottom wall 442 of motor housing 400 whereupon latching pawls 340 snaps over into openings 444 of housing 400. With the bearing surfaces 341 of latch pawls 340 of holder 329 being in a close contact with the corresponding upper bearing surfaces of openings 444 of motor housing 400, holder 329 is resiliently held against upward movement while the outer periphery of latching segments 334 in contact with the inner periphery of motor housing 400 prevents holder 329 from displacement in the radial direction. It will be understood that, according to the invention, holder 329 can be attached to motor housing 400 in a very simple manner. The terminal lugs 335 of holder 329 passed through the opening 447 in housing 400 enable the rotation detecting current induced in winding 314 to be supplied to a remote circuit whereby it is possible to control or regulate the speed of rotation of rotor block 200.

The stator block 100, rotor block 200, detector winding block 300 and motor housing 400 having the above-described construction are assembled together in sequence in the longitudinal direction to form an integral unitary electric motor.

In brief, detector winding block 300 is inserted and fitted within motor housing 400, with terminal lugs 335 secured to holder 329 of detector winding block 300 projected through opening 447 provided in bottom wall 442 of motor housing 400. The detector winding block 300 and motor housing 400 are fixed with one another by introducing detector winding block 300 in such a manner that openings 444 engage latching segments 334 serving to secure holder 329 forming part of detector winding block 300 to motor housing 400. Then, shaft 203 of rotor block 200 is inserted through bearings 114 and 115 of stator block 100 to support them with one another. The tongue 181 of control circuit substrate 104 forming part of stator block 100 is guided along recess 184 of motor housing 400 until it is supported on surface 186 at the base of recess 184. During the operation just described, tongue 183 of bracket 101 is also introduced in recess 184. Then, stopper 445 is fitted in cutouts 185 provided adjacent surface 186 of recess 184 in which is received tongue 181 of the control circuit substrate 104, so that tongue 181 is fixed in the recess 184.

Thus, the control circuit substrate 104 is immobilized in the circumferential direction as well as in the thrust direction. Connecting pins 192 mounted on connector 182 are utilized for connection to a remote power source. Finally, bracket 101 is secured to the motor housing 400 by turning the projections 421 over the inclined intermediate portions 174.

The electric motor according to the invention can be easily assembled from its component blocks by means of simple operation without resorting to fastening means for retaining these blocks with each other.

Although an illustrative embodiment of this invention has been described in detail herein with reference to the accompanying drawings, it is to be understood that the invention is not limited to that precise embodiment, and that various changes and modifications may be effected therein by one skilled in the art without departing from the scope or spirit of the invention as defined in the appended claims.

What is claimed is:

1. An electric motor comprising a stator assembly, a rotor assembly including a plurality of rotor magnets, a detecting winding assembly and motor housing means containing and relatively positioning said stator assembly, rotor assembly and detecting winding assembly; said stator assembly including stator windings, a control circuit substrate fixed relative to said stator windings so as to be positioned within the field of said rotor magnets, circuitry on said control circuit substrate for controlling a driving current supplied to said stator windings, and means mounted on said control circuit substrate for detecting the rotational position of said rotor magnets; said rotor assembly including a shaft rotatably journalled in said stator assembly, a magnet casing secured to said shaft and within which said plurality of rotor magnets are fixed, and a detector magnet secured to said shaft; and said detecting winding assembly being arranged in face-to-face relationship with said detector magnet for generating detecting signals in response to the rotation of said detector magnet with said shaft.

2. An electric motor according to claim 1; wherein said means mounted on said control circuit substrate for detecting the rotational position of said rotor magnets includes a plurality of position detector elements secured on said control circuit substrate in a fixed relationship, said stator assembly further includes a bobbin about which said stator windings are wound and being fixed positionally with respect to said control circuit substrate whereby said position detector elements are positioned in a fixed predetermined relationship with respect to said stator windings by means of said control circuit substrate and bobbin.

3. An electric motor according to claim 2; wherein a holder provided with recesses for receiving said position detector elements is secured to said control circuit substrate, said recesses being formed with a configuration so as to allow regulation of the position of said elements in a circumferential and radial direction for proper positioning of said elements with respect to said rotor magnets.

4. An electric motor according to claim 1; wherein said rotor assembly comprises a magnet casing having magnets secured therein and further includes an annular groove to receive an adhesive to firmly secure said magnets in said magnet casing.

5. An electric motor according to claim 4; wherein an annular magnet holder having a configuration accommodating the inner diameter of the magnet casing is arranged in and secured to the magnet casing and said plurality of magnets forming said rotor assembly are disposed respectively between pairs of positioning means provided at a side of said magnet holder.

6. An electric motor according to claim 1 wherein said detecting winding assembly is disposed outside the bottom of said magnet casing and a speed detecting winding therein is disposed concentrically with said detector magnet for detecting a voltage induced therein by the rotation of said detector magnet.

7. An electric motor comprising a stator assembly, a rotor assembly including a plurality of rotor magnets, a detecting winding assembly and motor housing means containing and relatively positioning said stator assembly, rotor assembly and detecting winding assembly;

said stator assembly including stator windings, a control circuit substrate having circuitry thereon for controlling a driving current supplied to said stator windings, means mounted on said current circuit substrate for detecting the rotational position of said rotor magnets, a bearing housing, an annular recess in said bearing housing having a reference surface and having a hook-shaped cross section, a bobbin about which said stator windings are wound, an end portion on said bobbin having serrations, and a compression spring interposed between said bearing housing and said bobbin, said annular recess, serrations and spring being arranged so that said serrations on said bobbin are urged by said spring into engagement with said reference surface of the annular recess to position said bobbin with respect to said bearing housing and stator windings;

said rotor assembly including a shaft rotatably journalled in said stator assembly, a magnet casing secured to said shaft and within which said rotor magnets are fixed, and a detector magnet secured to said shaft; and said detecting winding assembly being disposed within said motor housing means in face-to-face relationship with said detector magnet for producing detecting signals in response to the rotation of said detector magnet with said shaft.

8. An electric motor according to claim 7; wherein said bobbin has, along the inner periphery of one end thereof an annular recess, and a holding member has a flange which is press-fitted in said annular recess and grips said control circuit substrate between the flange of said holding member and the end of said bobbin.

9. An electric motor according to claim 7; wherein said bobbin has recesses extending longitudinally at one end thereof and opening at inner and outer sides of the bobbin, and said control circuit substrate has recesses corresponding to said recesses of said bobbin and being disposed along the inner periphery, ends of the stator windings wound on said bobbin extending outwards through said recesses of said bobbin and control circuit substrate.

10. An electric motor according to claim 7; wherein said control circuit substrate includes a tongue at one area along the periphery thereof, connector means is secured to said tongue for supplying electric power to said circuitry, and said motor housing means has an open end thereof with a longitudinally extending elongated recess receiving said tongue, said recess having a width substantially equal to that of said tongue so that the disposition of said tongue within said recess orients said stator assembly in a circumferential direction with respect to said motor housing means.

11. An electric motor according to claim 10; wherein said motor housing means has a circumferentially extending slot contiguous to said elongated recess, said circumferentially extending slot having a length greater than the width of said tongue, said recess having a bearing surface engaged with said tongue, and a stopper having a cross-section substantially the same as the configuration of said slot is engaged with a press-fit within said slot and thereby fixes said tongue against said bearing surface in said elongated recess.

12. An electric motor according to claim 7; wherein said bearing housing has a tubular opening at one end, a bearing member rotatably supporting said shaft and being press-fitted in said tubular opening, said motor housing means has a bracket for closing an end thereof, said bearing housing is clinched at said one end to said bracket, and said one end of the bearing housing has a stepped bore having an inner diameter slightly larger than the outer diameter of said bearing member press-fitted in said tubular opening of said bearing housing.

13. An electric motor comprising a stator assembly, a rotor assembly including a plurality of rotor magnets, a detecting winding assembly and motor housing means containing and relatively positioning said stator assembly, rotor assembly and detecting winding assembly;

said stator assembly including stator windings, a control circuit substrate fixed relative to said stator windings so as to be positioned within the field of said rotor magnets, circuitry on said control circuit substrate for controlling a driving current supplied to said stator windings, and means mounted on said control circuit substrate for detecting the rotational position of said rotor magnets;

said rotor assembly further including a shaft rotatably journalled in said stator assembly, a magnet casing secured to said shaft, said plurality of rotor magnets being fixed within said magnet casing, a detector magnet secured to said shaft, an annular groove containing an adhesive which firmly secures said plurality of rotor magnets in said magnet casing, a ring having a pair of opposed flanges in the circumferential periphery of said magnet casing and balance weight means for controlling the balance of said rotor assembly mounted between said pair of opposed flanges; and said detecting winding assembly being disposed within said motor housing means in face-to-face relationship with said detector magnet for producing detecting signals in response to rotation of said detector magnet with said shaft.

14. An electric motor according to claim 12; wherein said motor housing means and said bracket include cooperatively engaging projections and recesses concurrently determining the radial, circumferential and thrust-directional position of said bracket relative to said motor housing means, and a pair of inclined projections are provided one on said bracket and the other on said motor housing means in the vicinity of said recesses for restraining interlock with each other.

15. An electric motor comprising a stator assembly, a rotor assembly including a plurality of rotor magnets fixed therein, a detecting winding assembly and motor housing means which contains and relatively positions said stator assembly, rotor assembly and detecting winding assembly;

said stator assembly including stator windings, a control circuit substrate fixed relative to said stator windings so as to be positioned within the field of said rotor magnets, circuitry on said substrate for controlling a driving current supplied to said stator windings, and means mounted on said control circuit substrate for detecting the rotational position of said rotor magnets;

said rotor assembly including a shaft rotatably journalled in said stator assembly, a magnet casing secured to said shaft and within which said rotor magnets are fixed, said magnet casing having a bottom adjacent an end wall of said motor housing means, and a detector magnet secured to said shaft;

said detecting winding assembly being disposed concentric with said detector magnet and including a plurality of cores, a speed detecting winding on said plurality of cores, a holder supporting said speed detecting winding and having a plurality of flexible integral detent levers thereon, said plurality of flexible detent levers having an inner surface accommodating an outer periphery of said cores, and a positioning pawl on each of said detent levers extending inwardly toward said cores; and said detector magnet and detecting winding assembly being disposed between said bottom of said magnet casing and said adjacent end wall of said motor housing means.

16. An electric motor according to claim 15; wherein said holder has a plurality of latching segments along an outer periphery for engagement with said motor housing means, each of said latching segments having, at an end thereof, a latching pawl projecting radially outwardly and cooperating with a plurality of respective receiving openings formed in the side wall of said motor housing means in the vicinity of said adjacent end wall thereof.

17. An electric motor according to claim 15; wherein said detecting winding assembly includes a bobbin having a hub and a pair of opposed flanges located at respective ends of said hub, and a winding wound around said hub and having lead ends, one of said flanges being provided with projections guiding said lead ends of said winding.

* * * * *